(12) United States Patent
Singer et al.

(10) Patent No.: US 10,438,129 B1
(45) Date of Patent: *Oct. 8, 2019

(54) REGULARIZATION RELAXATION SCHEME

(71) Applicant: Google LLC, Mountain View, CA (US)

(72) Inventors: Yoram Singer, Palo Alto, CA (US); Tal Shaked, Los Altos, CA (US); Tushar Deepak Chandra, Los Altos, CA (US); Tze Way Eugene Ie, San Mateo, CA (US)

(73) Assignee: Google LLC, Mountain View, CA (US)

( * ) Notice: Subject to any disclaimer, the term of this patent is extended or adjusted under 35 U.S.C. 154(b) by 651 days.

This patent is subject to a terminal disclaimer.

(21) Appl. No.: 14/586,043

(22) Filed: Dec. 30, 2014

Related U.S. Application Data

(60) Provisional application No. 61/921,746, filed on Dec. 30, 2013.

(51) Int. Cl.
*G06N 20/00* (2019.01)

(52) U.S. Cl.
CPC ..................... *G06N 20/00* (2019.01)

(58) Field of Classification Search
CPC .............................. G06N 99/005; G06N 20/00

USPC ............................................................ 706/12
See application file for complete search history.

(56) References Cited

U.S. PATENT DOCUMENTS

| | | | |
|---|---|---|---|
| 7,650,331 B1 | 1/2010 | Dean et al. | |
| 8,260,117 B1 * | 9/2012 | Xu ..................... | H04N 21/4668 386/239 |
| 8,429,103 B1 | 4/2013 | Aradhye et al. | |
| 2014/0079297 A1 * | 3/2014 | Tadayon ................. | G06K 9/00 382/118 |

* cited by examiner

*Primary Examiner* — Ben M Rifkin
(74) *Attorney, Agent, or Firm* — Fish & Richardson P.C.

(57) ABSTRACT

Methods, systems, and apparatus, including computer programs encoded on computer storage media, for training machine learning systems. One of the methods includes receiving a plurality of training examples; and training a machine learning system on each of the plurality of training examples to determine trained values for weights of a machine learning model, wherein training the machine learning system comprises: assigning an initial value for a regularization penalty for a particular weight for a particular feature; and adjusting the initial value for the regularization penalty for the particular weight for the particular feature during the training of the machine learning system.

17 Claims, 9 Drawing Sheets

REGULARIZATION RELAXATION SCHEME

CROSS-REFERENCE TO RELATED APPLICATION

This application claims priority to U.S. Provisional Application No. 61/921,746, filed on Dec. 30, 2013. The disclosure of the prior application is considered part of and is incorporated by reference in the disclosure of this application.

BACKGROUND

Conventionally, at the start of a machine learning process, a machine learning system may contain potential features that are not correlated with the target (e.g., the system may contain a billion features, only a hundred of which are indicative of a prediction). Similarly, the machine learning models may not be trained on data that is representative of the distribution of data that the model will be applied to. As an example, a model may be configured to predict a video that a user is likely to watch, based on a currently viewed video. The training data used to generate the model is likely not to include features about new videos that are not part of the corpus of videos at the current time. Accordingly, the model may not perform optimally based only on training data that is not representative of the distribution of the data that the model is applied to.

BRIEF SUMMARY

According to implementations of the disclosed subject matter, a high regularization penalty may be applied to one or more features or templates. The high regularization penalty may be applied when the feature or template is first introduced to a machine learning system. The high regularization penalty may be relaxed based on factors such as frequency of features, accuracy of the model, feature, or template, and/or time or number of iterations of training to reduce the regularization. The regularization penalty may be relaxed in an iterative manner. Alternatively, a low regularization penalty may be applied to one or more features or templates. The low regularization penalty may be applied when the feature or template is first introduced to a machine learning system. The low regularization penalty may be increased based on factors such as frequency of features, accuracy of the model, feature, or template, and/or time or number of iterations of training to reduce the regularization.

Systems and techniques according to the present disclosure may assign a regularization term (e.g., a regularization penalty) that may enable directing a machine learning system to generate models that prefer using features (e.g., features from certain templates) when fitting data. Additional characteristics, advantages, and implementations of the disclosed subject matter may be set forth or apparent from consideration of the following detailed description, drawings, and claims. Moreover, it is to be understood that both the foregoing summary and the following detailed description include examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
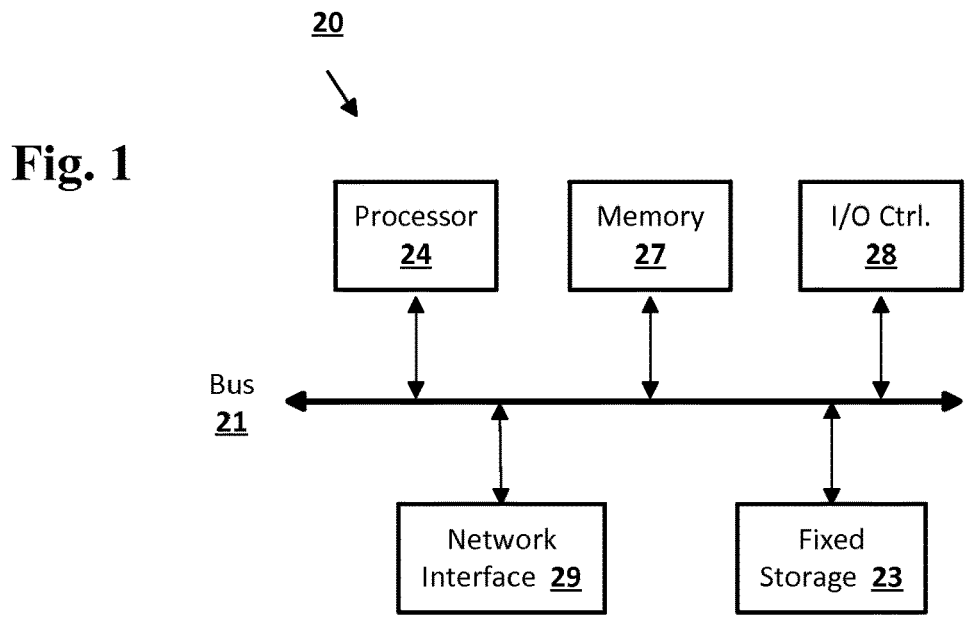
FIG. 1 shows a computer according to an implementation of the disclosed subject matter.

Techniques according to the present disclosure may enable pruning of features contained within a machine learning model. A machine learning process may include training based on many potential features that are not correlated with a target. The pruning may be achieved in a piecemeal way by incorporating a regularization term (e.g., a regularization penalty) that promotes sparsity and control the optimization path that a model takes during learning to ultimately be more converged and overall more reliable. The regularization term may assign initial zero weights or near zero weights to features and/or templates using a regularization penalty. Subsequently, as the learning procedure progresses, the accuracy in the prediction may improve as more labeled training examples may be used to train the machine learning system. Based on the training, the regularization may be reduced for features that correspond to accurate predictions. Similarly, new features may be introduced to the system as the system is trained. The regularization penalty for the new features may be high at first and relaxed as the new features lead to more accurate results or occur more frequently. Alternatively, the regularization penalty for a new feature may be low at first and may increase as the feature becomes more frequent. A frequency may be measured based on any applicable count such as an iterative count, a percentage, a count per unit of time, or the like. A model used to train a machine learning system may comprise multiple templates and/or features. A template may be associated with one or more features, as disclosed herein. A regularization penalty may be assigned to templates and/or features and the machine learning system may be trained using the model such that a feature associated with a template having a lower regularization penalty is given preference over a feature associated with a template having a higher regularization penalty. A regularization penalty, as disclosed herein, may control model complexity and improve model generalization such that a model trained by applying regularization penalties based on domain knowledge (e.g., based on historic data and/or user input) may be better suited to be applied to a distribution of data that is different than the training data used to train the machine learning model. A restrictive regularization penalty may be applied to a template or feature until the number of occurrences of the template or feature in the distribution of data exceeds an occurrence threshold amount or if the accuracy in the predictions by the model improves. The restrictive regularization penalty may be relaxed based on the frequency or accuracy based on the features, as disclosed herein. Alternatively, a low regularization penalty may be applied to a template or feature until the number of occurrences of the template or feature in the distribution of data exceeds an occurrence threshold amount or if the accuracy in the prediction by the model decreases. The restrictive regularization penalty may be increased based on the frequency or accuracy based on the features.

Figure 6:
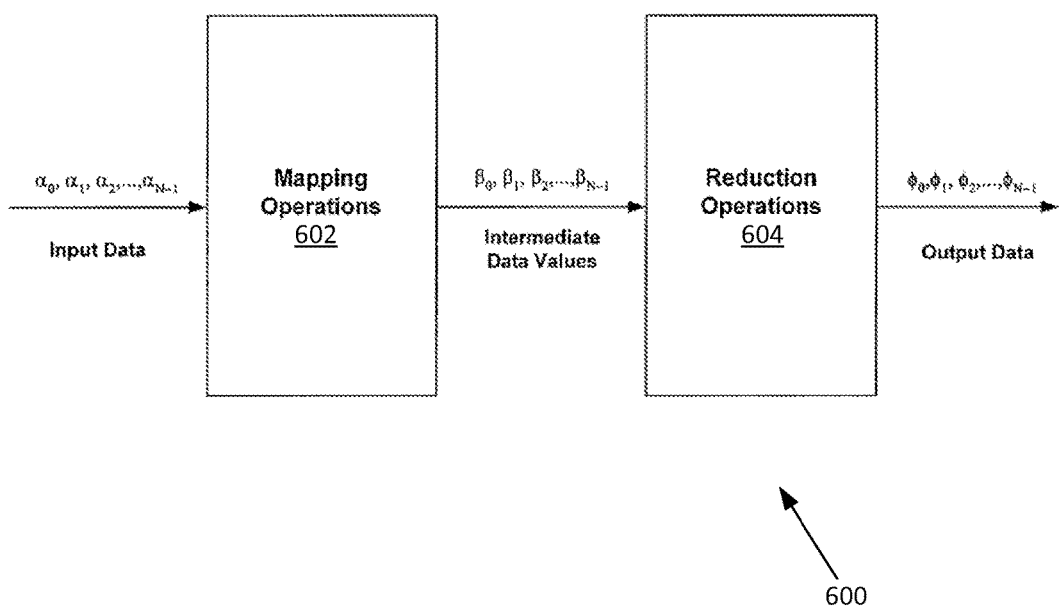
FIG. 6 shows an example process for a large-dataset distributed processing system operation, according to an implementation of the disclosed subject matter.

Techniques described herein can be applied to large-scale data processing and may be applied to large scale parallel data processing for machine learning. Such large-scale processing may be performed in a distributed data processing system, such as a datacenter or a network of datacenters. For example, large-scale Internet services and the massively parallel computing infrastructure that support such services may employ warehouse-sized computing systems, made up of thousands or tens of thousands of computing nodes. FIG. 6 shows a general overview of a large-scale data processing model 600 that may be applied herein to train a machine learning system. The data processing model 600 may include mapping operations 602 and reduction operations 604. The mapping operations 602 may apply one or more mapping operations to a set of input data $\alpha_i$ (e.g., text files, records, logs, sorted maps, etc.) to provide a set of intermediate data values $\beta_i$. The reduction operations 604 may apply one or more reduction operations to the set of intermediate data values $\beta_i$ to provide a set of output data $\varphi_i$ (e.g., tables, sorted maps, record I/O, etc.). According to one or more implementations, the mapping operations 602 may be implemented by one or more application-specific mapping functions, which map a set of input data $\alpha_i$ to a set of intermediate data values $\beta_i$. The intermediate data values $\beta_i$ may be stored in one or more intermediate data structures. Some examples of intermediate data structures include files, buffers, histograms, count tables and any other suitable data structure or device for storing digital information. The intermediate data values $\beta_i$ are processed by the reduction operations 604, which may be implemented by one or more application-specific reduction functions, which reduce the set of intermediate data values $\beta_i$ to a set of output data $\varphi_i$.

The techniques disclosed herein, such as the general process described with respect to FIG. 6, may utilize a large-dataset distributed processing system. In general, in a large-dataset distributed processing system process, data may be divided into input data blocks that are processed by mappers. The mappers apply a map operation to the input to produce key-value pairs (e.g., such as feature-statistic pairs, as disclosed herein) as map output, and the map output is sent to reducers where values associated with the same key are combined to produce a final value for each key. Each reducer may be responsible for a subset of the keys. The process for distributing data to reducers may be referred to as shuffling, and may result in each reducer receiving, from each mapper, the key-value pairs for which the reducer is responsible. Further description and examples of a large-dataset distributed processing system or machine learning and similar techniques are provided in U.S. Pat. Nos. 7,650,331 and 8,429,103, the contents of each of which are incorporated by reference herein for all purposes, in their entirety.

The techniques disclosed herein may be used to generate machine learned models using supervised learning data such as labeled examples. The labeled examples may be input into a machine learning system and the output from the machine learning system may be a machine learned model that contains weights that are generated in response to the labeled data. The labeled examples may contain both an outcome and properties associated with a specific instance. A machine learning system may receive labeled data (e.g., labeled examples) to train a machine learned model that contains weights that are generated in response to the supervised labeled data.

According to an implementation of the disclosed subject matter, a machine learning system may be used to generate and/or update models that are used to make regression based predictions and/or provide rankings. It will be understood that one or more of the components may be located either local to a single entity (e.g., computer, database, server, etc.) or may be located across multiple entities.

The present disclosure provides techniques based on feature templates and cross templates. A template may be a category of feature-types and a template may include multiple features, all of which are from the same category. A template may be a single category of features (e.g., a base template) or multiple categories of features (e.g., a cross-template). A specific type of template may be a base template that is a single category of features. For example, a base template may be "language" and the features included in the template may be English, Spanish, French, German, Hindi, Italian, Japanese, and the like. Each of these features may be associated with a previous example that was received by the system. As another example, a base template may be "country" and the features included in the template may include United States, Canada, France, United Kingdom, Mexico, Japan, India, Italy, China, Australia, and the like. Yet another example may be the base template "keyword" that may include features such as "keyword:free" and "keyword:books". According to the present disclosure, regularization penalties may be applied to cross-templates. A cross-template may be another special type of template that is a cross of two or more base templates. A cross-template may be constructed from a combination of templates such as "country X keyword" which will include features such as "US X books" and "France X free". In machine learning models that may contain 100s of billions of features, a well performing model may have, for example, 100 or more total templates, many of which may be cross-templates containing 3 or more combinations of templates.

A cross-template may be constructed from a combination of templates by generating a cross product by crossing all of the features from one template with all of the features from another template. For example, a template "country" may be crossed with a template "keyword". The template "country" may include the features "United States", "Canada", and "France" and the template "keyword" may include the features "books", "free", and "dog." A cross product template "country X keyword" would include the features "United States X books", "Canada X books", "France X books", "United States X free", "Canada States X free", "France X free", "United States X dog", "Canada X dog", and "France X dog". Each of these features in the cross template may be associated with examples in which the feature occurred. For example, a statistic associated with the feature "United States X books" would be based on examples in which both features "United States" and "books" were present. A cross template may be constructed from any number of templates; however, as the number of templates included in a cross template increase, the number of relevant examples may decrease. For example, in contrast to the cross template "country X keyword" described above, there may be a relatively small number of examples associated with a cross template "country X keyword X language X gender X ad ID X video ID" since there may be only a few number of examples in which features from all the templates "country", "keyword", "language", "gender", "ad ID", and "video ID" occurred. In some cases, a cross-template may be constructed based on self-crossing of a template. For example, the template "keyword" may include the features "plasma" and "TV". The system may have received 6 examples including the feature "plasma", 18 examples including the feature "TV" and among all these examples, 2 examples may include both the features "plasma" and "TV". The template "keyword" may be crossed with the template "keyword" in which case the relevant examples would be restricted to examples in which 2 or more features from the keyword template are included such as the 2 examples that included both features "plasma" and "TV".

According to implementations of the disclosed subject matter, a more emphasized feature (i.e., a feature with a lower regularization penalty) may be accentuated by amplifying the weight associated with the feature. As an example, if a feature X has an original weight of 0.4, a lower regularization penalty may amplify the weight to 0.6 such that feature X is emphasized. A less emphasized feature (i.e., a feature with a higher regularization penalty) may be dampened by reducing the weight associated with the template. As an example, if a feature Y has an original weight of 0.4, a higher regularization penalty may dampen the weight to 0.2 such that feature Y is less emphasized. A more emphasized feature may correspond to a higher prediction more so than a less emphasized feature. As an example, feature X in the previous examples may contribute to a higher prediction more so than feature Y as the feature X may be weighted higher. It will be understood that the weight amplification and/or dampening may be applied in any manner such that amplification emphasizes a feature whereas a dampening deemphasizes it.

Figure 3A:
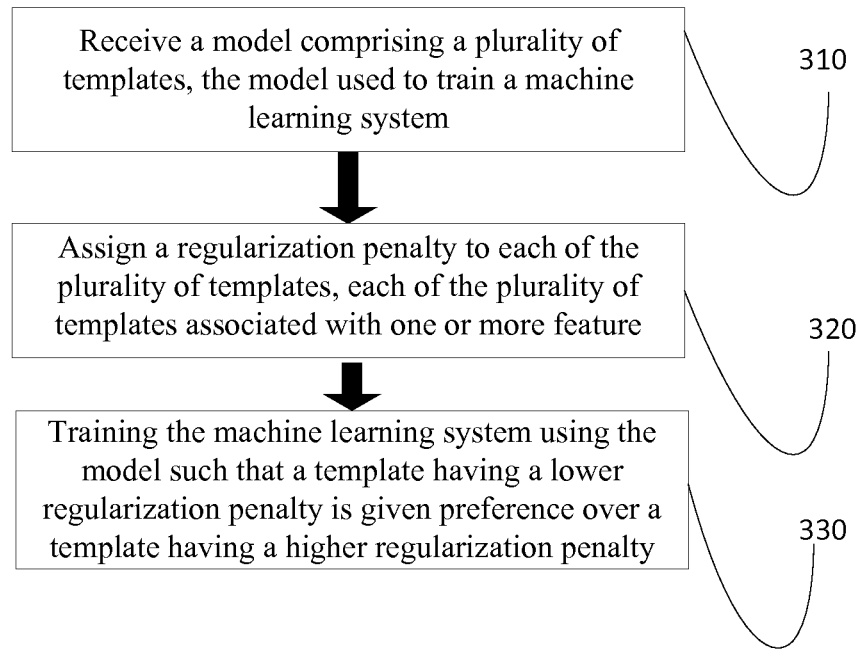
FIG. 3a shows an example process of training a machine learned model, according to an implementation of the disclosed subject matter.

According to an implementation of the disclosed subject matter, as shown in FIG. 3, at step 310, a model comprising a plurality of templates (e.g., base templates and/or cross-templates) may be received. The model may be generated using a machine learning system that is trained using labeled examples, as disclosed herein. According to implementations, each template may be associated with a feature and each feature may have a weight associated with the feature. For example, a feature video_ID:123_X_country: US may be associated with the template videoID X language and may have a weight of 0.4 associated with it. Notably, the model containing weighted features may be used to make predictions such as, for example, how likely a viewer that has selected a given language is to select a video that corresponds to a given videoID.

According to an implementation, at step 320, a regularization penalty may be assigned to each of the templates. A regularization penalty may control model complexity and improve model generalization such that, at 330, a model trained by applying regularization penalties may be better suited to be applied to a distribution of data that is different than the training data used to train the machine learning model. Machine learning models may be trained using labeled examples that are not representative of the distribution that the model will be applied to. As a specific example, a machine learning model may be generated based on example training data that contains data corresponding to video A through video G (i.e., video A, video B, video C . . . ). The trained machine learning model may be used to make predictions regarding the likelihood that a user will select a video for viewing. For example, the machine learned training model may be trained to predict whether a user associated with features 1, 2 and 3, is likely to view video B. However, the machine learning model may be used to predict whether a user is likely to view videos (e.g., videos H and I) in addition to the videos on which the machine learning model was trained on (i.e., video A through video G). Here, the machine learning model that is trained on a set of learned examples may not perform as well when applied to examples that the model was not trained on (e.g., videos H and I).

As an illustrative example of how regularization penalties may effect predictions, a video with an unusually high view rate that has only been served in the United States may have the following features: {video_id:123, video_ID_X_country:123_X_US}. The feature 'video_id:123' may correspond to the identification associated with the video (i.e., 123) and the feature 'video_ID_X_country:123_X_US' may correspond to the video 123 being viewed in the United States. A machine learning system may be trained on the video and its corresponding view rate and, based on the unusually high view rate, the machine learning system generate a model that assigns positive weights to both features to indicate that the view rate is good for this video. However, the machine learning model may not distinguish between the weight distributions such that one feature is assigned a higher weight than the other as, without regularization penalties, for example, an equal weight may be distributed across both features. Continuing the example, the video may be served in another country (e.g., France). The model may be applied to features {video_id:123, video_id_X_country:123_X_FR} such that the positive weight from video_ID may boost the prediction, and may result in a prediction that is incorrectly too high. Techniques disclosed herein may assign regularization penalties to one or more weights such that the resulting weights may be optimized by emphasizing the feature e.g., video_id_X_country:123_X_US highly in comparison to the feature e.g., video_ID:video_123. The result may be that the presence of feature video_id_X_country:123_X_US in an untrained example may lead to a prediction that a user is likely to view the video, more so than just the feature video_ID:video_123.

A regularization penalty may be assigned to a feature such that the model trained using the regularization penalty may amplify or reduce the emphasis placed on the respective feature. A higher regularization penalty may correspond to less emphasis placed on a feature and a lower regularization penalty may correspond to more emphasis placed on a feature. Continuing the previous example, a higher regularization penalty may be assigned to video_ID:video_123 than video_id_X_country:123_X_US such that the model emphasizes video_id_X_country:123_X_US more so than video_ID:video_123. As a specific example, the regularization penalty associated with video_ID:video_123 may be 2 whereas the regularization penalty associated with video_id_X_country:123_X_US may be 0.5. The disproportionate regularization penalties may encourage the model to make predictions in a more generalized sense. As a more specific example, by assigning a lower regularization penalty to video_id_X_country:123_X_US, a model may be trained to predict that there is a higher probability that a user may view the video (i.e., the video corresponding to video_ID:123) based on the 'user viewing the video in the United States' more so than 'a user viewing the video'. Notably, the feature video_id_X_country:123_X_US may be less regulated and, thus, more emphasized compared to the feature video_ID:video_123. Subsequently, the model may be used to predict whether a user in France views the video such that the features associated with this example are: {video_ID:123, video_ID_X_country:123_X_FR}. Because the feature 'video_ID:123' was not weighed highly, a prediction given the features {video_ID:123, video_ID_X_country:123_X_FR} will be lower than if no restriction penalty was applied. Essentially, the model may not predict that a 'user may view the video in France' as highly based on the training that a user is highly probable to view the video in the United States.

It will be understood that although viewing videos is used as an example for training a machine learning model and making predictions based on that model, any regression, ranking, rating, conversion, rate, count, probability, and/or the like may be predicted using the techniques disclosed herein.

Figure 3B:
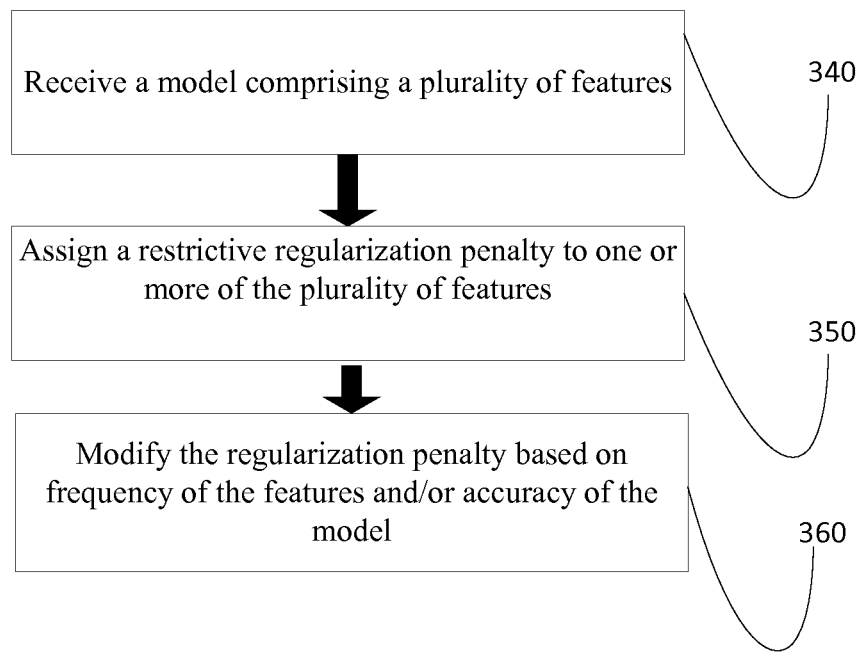
FIG. 3b shows an example process of relaxing a regularization penalty, according to an implementation of the disclosed subject matter.

According to implementations of the disclosed subject matter, as shown at step 340 in FIG. 3*b*, a model comprising a plurality of features may be received. The features may have weights associated with them and the weights may be generated based on labeled examples used to train the machine learning system that generates the model, as disclosed herein. As an example, a machine learned model may contain 100 features labeled n1, n2 . . . n100. Each feature n1-n100 may have a weight associated with the feature.

At 350, a high regularization penalty may be applied to all features within the machine learning model. The high regularization penalty may be applied regardless of the weight associated with the model. As disclosed herein, a high regularization penalty may correspond to less emphasis placed on a feature associated with a template and a lower regularization penalty may correspond to more emphasis placed on a feature associated with a template. Continuing the previous example, weights n1-n100 may have a high regularization penalty applied to each feature (e.g., a regularization penalty of 200 such that the penalty is inversely applied to a weight w1 corresponding to node n1 to result in a regularized weight of (w1/200). Effectively, the high regularization penalty may reduce the weight allotted to each feature (deemphasize each feature).

At 360, the regularization penalty for one or more identified features may be modified based on the frequency of features, accuracy of the model, and/or time or number of iterations of training to reduce the regularization. The frequency of a feature may correspond to the number of times (or number of times within a unit time) that a feature is present (e.g., Boolean 1) within a labeled example when the outcome of the labeled example is affirmative (e.g., positive). Continuing the previous example, from the 100 features (i.e., n1-n100), only features n4, n32, and n43 may occur more than 10 times in a set of labeled examples when the label outcome is positive. More specifically, if the label outcome is whether a user selected a link with link_ID:ABC, then the link with link_ID:ABC was selected in examples that contained only features n4, n32, and n43 at least 10 times (i.e., above an occurrence threshold of 10). Accordingly, based on the frequency and accuracy of the features, the regularization penalty for features n4, n32, and n43 may be relaxed to 50 (such that the penalty is inversely applied to a weights w4, w32, and w43 to result in regularized weights of (w4/50), (w32/50), and (w43/50)). The regularization penalties for the remaining features may remain at 200 such that n4, n32, and n43 are emphasized when the resulting model is applied to unlabeled features. The time or number of iterations of training may correspond to the number of iterations or amount of time for which a model is place through a machine learning system. As an example, a high regularization penalty may be applied to a feature the first time the feature appears in an example data set. The high regularization penalty may be reduced when the feature appears 15 times and may be reduced further when the feature appears 25 times. Alternatively, as another example, a low regularization penalty may be applied to a feature the first time the feature appears in an example data set. The low regularization penalty may be increased if the feature does not appear 15 times within a first day and may be increased further when the feature does not appear 15 times within an additional second day.

Figure 7A:
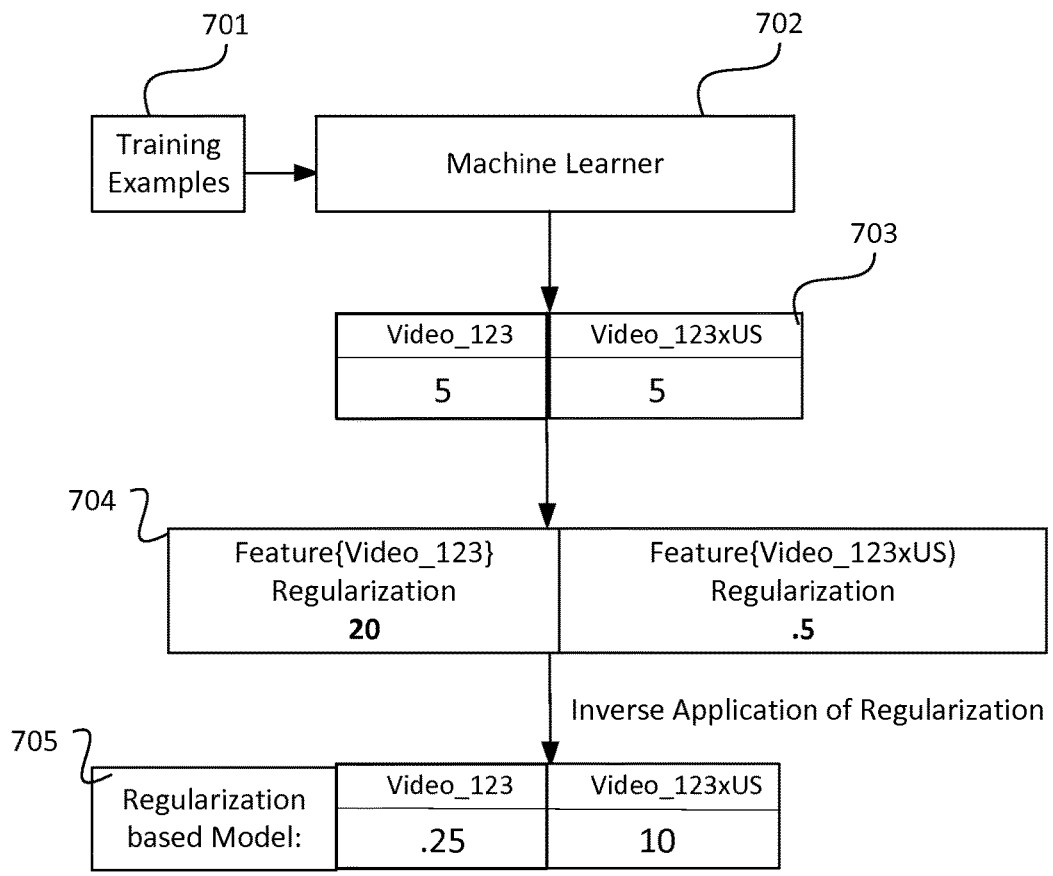
FIG. 7a shows an example regularized model, according to an implementation of the disclosed subject matter.

The application of regularization penalties may be fine-tuned based on factoring in the frequency, accuracy, and/or time or number of iterations of training to reduce the regularization. The regularization penalties may be gradually reduced or increased based on the factoring such that a more accurate and/or converged model is produced. This may be different than, for example, applying a predetermined or single calculated regularization penalty for a feature or template without factoring in the frequency, accuracy, and/or time or number of iterations of training when determining a regularization penalty. In an illustrative example of the disclosed subject matter, as shown in FIG. 7*a*, a machine learner 702 may generate a machine learning model and may update the model based on training examples. Initially, a high regularization penalty of 20 may be applied to all features in a model generated based on the machine learner 702. Training examples 701 may be provided to the machine learner 702. The training examples may contain data that corresponds to users located in the United States viewing video_123 at a high rate. Based on the techniques disclosed herein, the machine learner 702 may generate weights for the features {video_ID:123, video_ID_X_country:123_X_US} such that, since the training examples only contained examples for users located in the United States viewing video_123 at a high rate, the weight for feature video_ID:123 and feature video_ID_X_country:123_X_US is the same: 5, as shown at 703. Notably, according to this example, the machine learned model may not distinguish between whether a user viewed the video or a user viewed the video in the United States and, thus, may weigh them equally. However, based on the techniques disclosed herein, the regularization penalties associated with features in the machine learned model may be modified based on the frequency and/or accuracy of the features in the training examples. The frequency at which the feature video_ID_X_country:123_X_US is present in labeled examples where a viewer has viewed the video may exceed an occurrence threshold of 15%. The frequency at which the feature video_ID:123 is present in labeled examples may be below the occurrence threshold of 15%. Accordingly, in this example, the feature video_ID:123 may maintain a high regularization penalty of 20 as the frequency of occurrences of the feature video_ID:123 for positive outcomes may not exceed an occurrence threshold. The feature video_ID_X_country:123_X_US may correspond to a regularization penalty of 0.5, as shown at 704, such that more emphasis is to be placed on feature video_ID_X_country:123_X_US than on feature Video_ID:Video123. Accordingly, the regularization penalties may be inversely applied to the weights 703 (i.e., Video_123: 5/20 and Video_IDxCountry:5/0.5), resulting in a regularized model 705 with the weight for the feature 'Video_123' equal to 0.25 and the weight for the feature 'Video_123xUS' equal to 10. Notably, in the regularized model, the feature 'Video_123' may be less emphasized than the feature 'Video_123xUS'.

Figure 5:
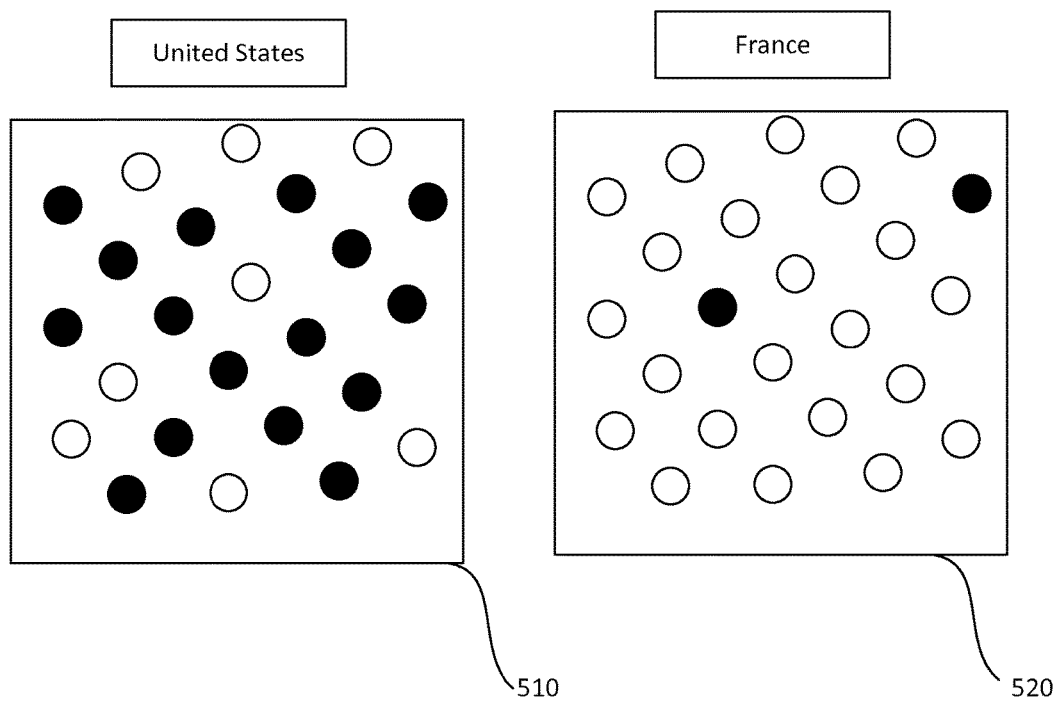
FIG. 5 shows an example illustration of percentages of users in different countries that view a video, according to an implementation of the disclosed subject matter.
Figure 7B:
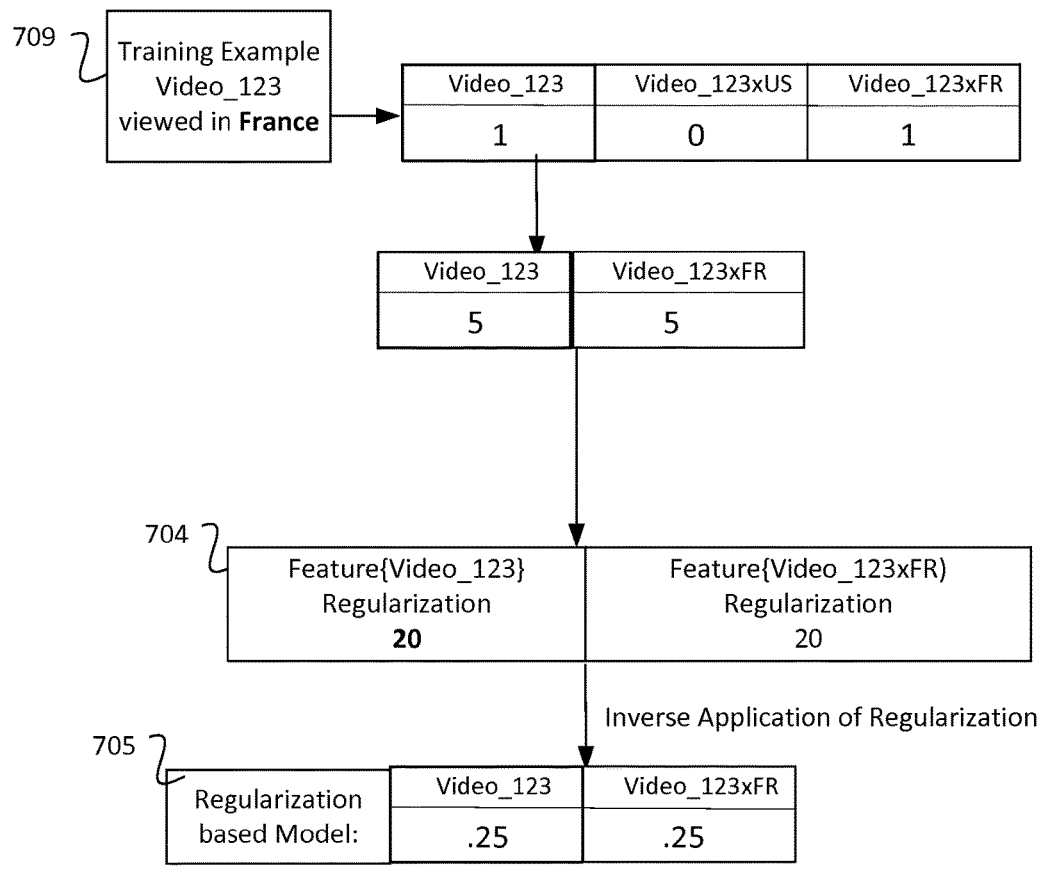
FIG. 7b shows an example prediction based on a regularized model, according to an implementation of the disclosed subject matter.

As shown in FIG. 7b predictions for unlabeled examples may be generated using the regularized model of FIG. 7a. As shown in FIG. 7b, the model of 7a may be applied to an example with features 'Video_123' and 'Video_123_X_FR', at 709, such that the model may predict the probability that a user in France views the video_123. The model may be applied to 709 such that the Boolean value associated with the feature 'Video_123' is 1, resulting in the weight 0.25 associated with feature 'Video_123' being multiplied by 1 resulting in 0.25. Similarly, the Boolean value associated with the feature 'Video_123xUS' is 0 (i.e., the user in this example is not located in the US), resulting in the weight 10 associated with feature 'Video_123xUS' being multiplied by 0 resulting in 0. Similarly, the Boolean value associated with the feature 'Video_123xFR' is 1 (i.e., the user in this example is located in France). As disclosed herein, the default feature regularization penalty may be 20 and, therefore, the resulting weight associated with feature 'Video_123xFR' may be 0.25 (i.e., 1×0.25). Accordingly, the probability value for a user in France viewing the video_123 is 0.5 (i.e., 0.25+0+0.25) or may be within a range [0,1] based on the value 0.5. FIG. 5 shows an example of possible viewers in the United States within box 510 and possible viewers in France within box 520. Each circle in box 510 and 520 represents a possible viewer. A filled circle represents a user that views a video and an empty circle represents a user that does not view a video. As shown in FIG. 5, the percentage of viewers that view video_123 in the United States 510 may be significantly higher than the percentage of viewers that view the same video_123 in France 520. The regularized model trained only on labeled examples corresponding to the United States users may be more accurate when predicting the probability that a viewer in either country is likely to view the video_123. Notably, using a high default regularization penalty, a model may be trained to be generalized based on frequency and/or accuracy such that features not contained (or not frequent/accurate) in the training examples may be more accurately predicted.

According to an implementation of the disclosed subject matter, as disclosed herein, a high regularization penalty may be assigned to a feature based on an occurrence value associated with the feature. The high regularization penalty for a feature may be a high regularization penalty such that weights for features associated with the template may not be emphasized when making a prediction based on the features. The high regularization penalty may be assigned to the feature as long as the occurrence or accuracy value associated with the feature is below an occurrence threshold. The high regularization penalty may be modified to a lower regularization penalty if the occurrence (i.e., frequency and/or accuracy) value associated with the features corresponding to the template meets or exceeds the occurrence threshold.

Figure 4A:
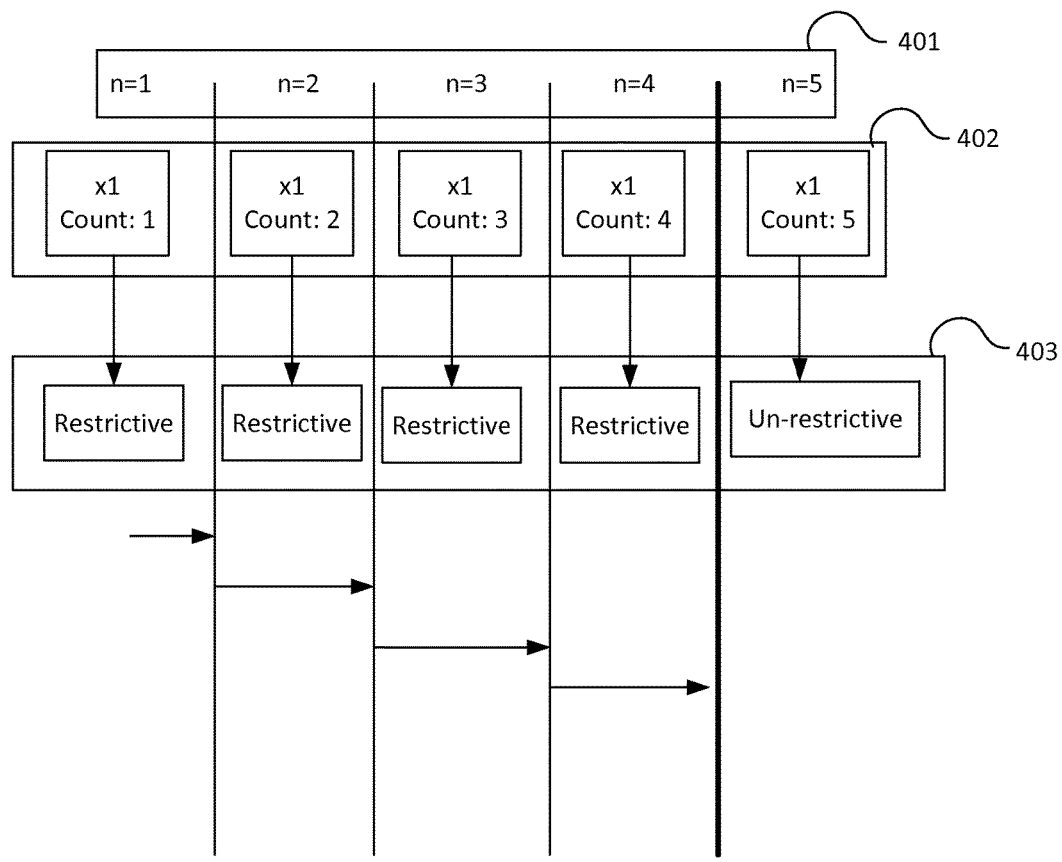
FIG. 4a shows an example illustration for assigning a regularization penalty based on a stability threshold, according to an implementation of the disclosed subject matter.

As a specific example, an occurrence threshold for training a machine learning system may be 5 occurrences of a feature. An example feature may be the language 'English'. An occurrence of the feature 'English' may occur when the language 'English' is a feature in a labeled training example that has a positive outcome. As an example, a high regularization penalty may be assigned to the feature 'English' if labeled examples used to train a machine learning model contain less than 5 occurrences of the features 'English'. If additional labeled examples are used to train the machine learning model such that the labeled examples include the feature 'English' such that the occurrence value exceeds 5, then the high regularization penalty may be lowered such that the weights for features associated with the feature 'English' are emphasized more than with the high regularization penalty. In an illustrative example, as shown in FIG. 4a, distinct occurrences 401 (i.e., n=1 to n=5) may represent instances of distinct occurrences in labeled examples such that n=2 corresponds to two distinct occurrences and n=3 corresponds to three distinct occurrences, etc. The occurrence counter 402 may correspond to feature x1 such that the count is increased by 1 for when the feature x1 occurs in one or more labeled examples. The penalty designator 403 corresponds to the restriction level such that a 'Restrictive' penalty is a high penalty such that weights for features associated with feature x1 are not emphasized and a 'Unrestrictive' penalty is a lower penalty such that the weights for features associated with feature x1 are emphasized. As shown, if the occurrence threshold is 5, then the penalty for features associated with feature x1 is high and, at n=5, when the number of occurrences meets the stability threshold of 5, the penalty is reduced to a 'Un-restrictive' penalty.

Figure 4B:
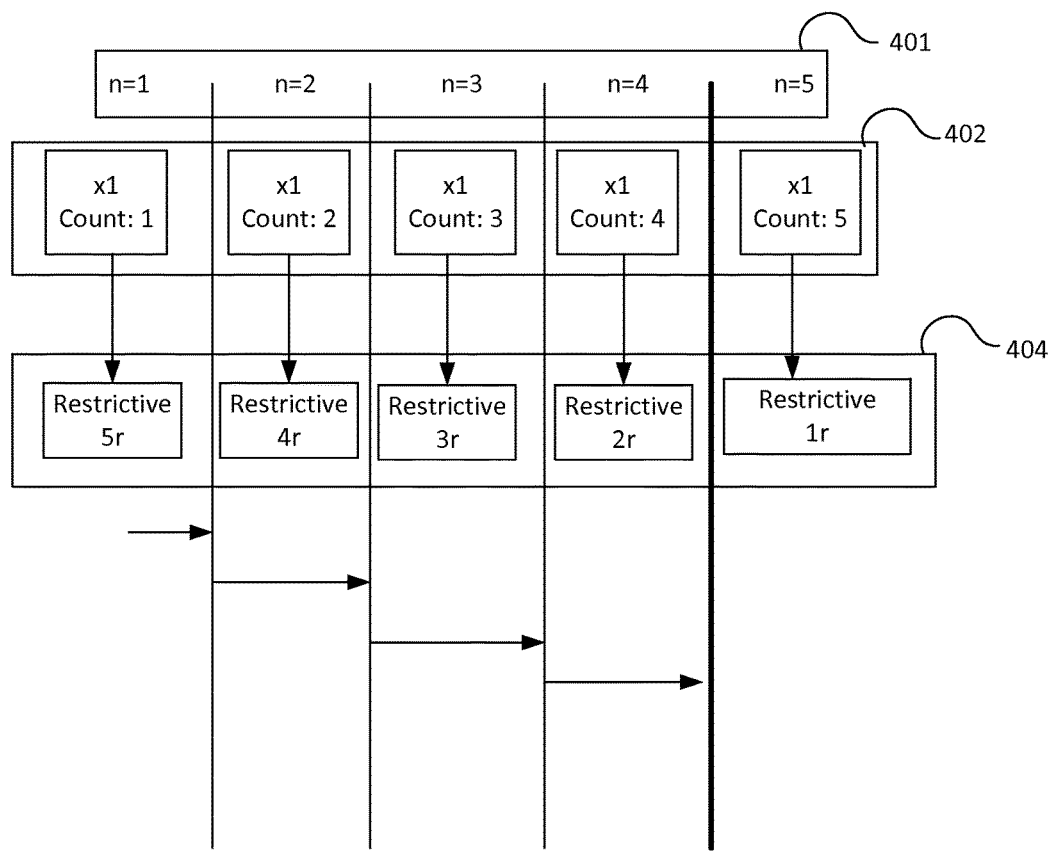
FIG. 4b shows an example illustration for relaxing a regularization penalty, according to an implementation of the disclosed subject matter.

Similarly, in another illustrative example, as shown in FIG. 4b, distinct occurrences 401 (i.e., n=1 to n=5) may represent instances of distinct occurrences in labeled examples such that n=2 corresponds to two distinct occurrences and n=3 corresponds to three distinct occurrences, etc. The occurrence counter 402 may correspond to feature x1 such that the count is increased by 1 for when the feature x1 occurs in one or more labeled examples. The penalty designator 404 corresponds to the restriction level such that a higher Restrictive penalty (e.g., 5r) is a high penalty such that weights for features associated with feature x1 are not emphasized and a lower Restrictive penalty (e.g., 1r) is a lower penalty such that the weights for features associated with feature x1 are emphasized. According to this example, the restrictive penalty may be lowered with each occurrence of the feature x1. As shown, a high restrictive penalty, 5r, may be applied to the feature x1 when the occurrence count is 1, a lower restrictive penalty, 4r at count 2, an even lower restrictive penalty 3r at count 3, an even lower restrictive penalty 2r at count 4, and the lowest restrictive penalty 1r at count 5.

Implementations of the presently disclosed subject matter may be implemented in and used with a variety of component and network architectures. FIG. 1 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 2.

Many other devices or components (not shown) may be connected in a similar manner, such as document scanners, digital cameras, auxiliary, supplemental, or backup systems, or the like. Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 2:
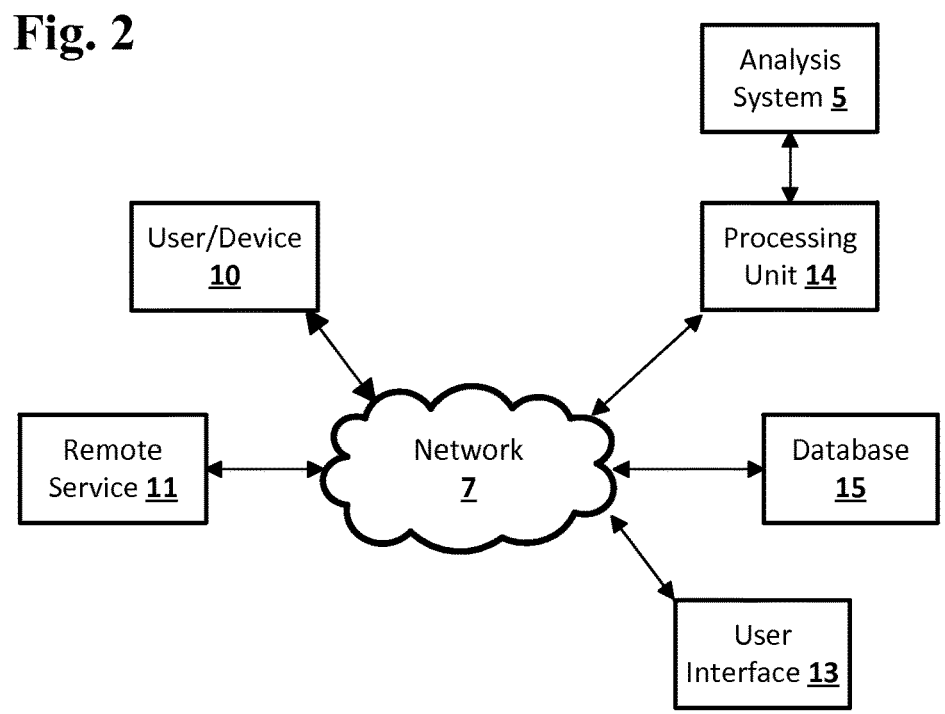
FIG. 2 shows a network configuration according to an implementation of the disclosed subject matter.

FIG. 2 shows an example arrangement according to an embodiment of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, and user interface systems 13. In some cases, clients 10, 11 may communicate with a user interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

In situations in which the implementations of the disclosed subject matter collect personal information about users, or may make use of personal information, the users may be provided with an opportunity to control whether programs or features collect user information (e.g., a user's performance score, a user's work product, a user's provided input, a user's geographic location, and any other similar data associated with a user), or to control whether and/or how to receive instructional course content from the instructional course provider that may be more relevant to the user. In addition, certain data may be treated in one or more ways before it is stored or used, so that personally identifiable information is removed. For example, a user's identity may be treated so that no personally identifiable information can be determined for the user, or a user's geographic location associated with an instructional course may be generalized where location information is obtained (such as to a city, ZIP code, or state level), so that a particular location of a user cannot be determined. Thus, the user may have control over how information is collected about the user and used by an instructional course provider.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

What is claimed is:

1. A method for training a machine learning model, the method comprising:
   receiving, by a machine learning system, a plurality of training examples, wherein each training example comprises one or more features that identify properties of a respective training instance;
   training, by the machine learning system, the machine learning model on the plurality of training examples to determine trained values for weights of the machine learning model, wherein the machine learning model comprises a respective weight for each feature found in any of the training examples processed by the machine learning model, wherein the machine learning model is configured to process each of the training examples to determine a predicted output for the training example from current values of the weights for the features in the training example, and wherein training the machine learning model comprises:
   assigning a respective initial value for a regularization penalty for a particular weight for a particular feature, wherein the machine learning model is configured to determine the predicted output for each training example that comprises the particular feature by performing computations that include combining a current value for the regularization penalty for the particular weight for the particular feature with the current value of the particular weight for the particular feature, determining whether a frequency of training examples processed by the machine learning model that comprise the particular feature exceeds a threshold frequency, and responsive to determining that the frequency of training examples processed during the training of the machine learning model that comprise the particular feature exceeds the threshold frequency, decreasing the initial value for the regularization penalty for the particular weight for the particular feature during the training of the machine learning model; and generating, after completion of the training of the machine learning model, a trained machine learning model based on the trained values for the weights whose values have been adjusted based on the respective regularization penalties.

2. The method of claim 1, wherein the training examples are each labeled with either a positive label or negative label.

3. The method of claim 2, wherein determining whether the frequency of training examples processed by the machine learning model that comprise the particular feature exceeds the threshold frequency comprises:

determining whether more than a threshold proportion of training examples processed by the machine learning model that have a positive label comprise the particular feature.

4. The method of claim 1, further comprising:

determining whether a frequency of training examples processed by the machine learning model within a predetermined amount of time that comprise the particular feature does not exceed a threshold frequency; and responsive to determining that the frequency of training examples processed by the machine learning model within the predetermined amount of time that comprise the particular features does not exceed the threshold frequency, increasing the initial value of the regularization penalty for the weight for the particular feature.

5. The method of claim 4, wherein determining whether a frequency of training examples processed by the machine learning model within a predetermined amount of time that comprise the particular feature does not exceed a threshold frequency comprises:

determining whether a number of occurrences of training examples processed by the machine learning model within the predetermined amount of time that comprise the particular feature does not exceed a threshold frequency.

6. The method of claim 1, wherein the particular feature belongs to a base template, wherein a base template is a feature category that includes features of a single feature type.

7. The method of claim 1, wherein the particular feature belongs to a cross-template, wherein the cross-template is a feature category that includes a plurality of features, with each of the plurality of features being of a respective feature type.

8. The method of claim 1, wherein the training instances are potential video viewings, and wherein the predicted output is a prediction of whether or not a particular user will view a particular video.

9. A system comprising one or more computers and one or more storage devices storing instructions that when executed by the one or more computers cause the one or more computers to perform operations:

receiving a plurality of training examples, wherein each training example comprises one or more features that identify properties of a respective training instance;

training a machine learning model on each of the plurality of training examples to determine trained values for weights of the machine learning model, wherein the machine learning model comprises a respective weight for each feature found in any of the training examples processed by the machine learning model, wherein the machine learning model is configured to process each of the training examples to determine a predicted output for the training example from current values of the weights for the features in the training example, and wherein training the machine learning model comprises:

assigning a respective initial value for a regularization penalty for a particular weight for a particular feature, wherein the machine learning model is configured to determine the predicted output for each training example that comprises the particular feature by performing computations that include combining a current value for the regularization penalty for the particular weight for the particular feature with the current value of the particular weight for the particular feature, determining whether a frequency of training examples processed by the machine learning model that comprise the particular feature exceeds a threshold frequency, and responsive to determining that the frequency of training examples processed during the training of the machine learning model that comprise the particular feature exceeds the threshold frequency, decreasing the initial value for the regularization penalty for the particular weight for the particular feature during the training of the machine learning model; and generating, after completion of the training of the machine learning model, a trained machine learning model based on the trained values for the weights whose values have been adjusted based on the respective regularization penalties.

10. The system of claim 9, wherein the training examples are each labeled with either a positive label or negative label.

11. The system of claim 10, wherein determining whether the frequency of training examples processed by the machine learning model that comprise the particular feature exceeds the threshold frequency comprises:

determining whether more than a threshold proportion of training examples processed by the machine learning model that have a positive label comprise the particular feature.

12. The system of claim 9, further comprising:

determining whether a frequency of training examples processed by the machine learning model within a predetermined amount of time that comprise the particular feature does not exceed a threshold frequency; and responsive to determining that the frequency of training examples processed by the machine learning model within the predetermined amount of time that comprise the particular features does not exceed the threshold frequency, increasing the initial value of the regularization penalty for the weight for the particular feature.

13. The system of claim 12, wherein determining whether a frequency of training examples processed by the machine learning model within a predetermined amount of time that comprise the particular feature does not exceed a threshold frequency comprises:

determining whether a number of occurrences of training examples processed by the machine learning model within the predetermined amount of time that comprise the particular feature does not exceed a threshold frequency.

14. The system of claim 9, wherein the particular feature belongs to a base template, wherein a base template is a feature category that includes features of a single feature type.

15. The system of claim 9, wherein the particular feature belongs to a cross-template, wherein the cross-template is a feature category that includes a plurality of features, with each of the plurality of features being of a respective feature type.

16. The system of claim 9, wherein the training instances are potential video viewings, and wherein the predicted output is a prediction of whether or not a particular user will view a particular video.

17. A non-transitory computer storage medium encoded with a computer program, the computer program comprising instructions that when executed by the one or more computers cause the one or more computers to perform operations comprising:

receiving a plurality of training examples, wherein each training example comprises one or more features that identify properties of a respective training instance;

training a machine learning model on the plurality of training examples to determine trained values for weights of the machine learning model, wherein the machine learning model comprises a respective weight for each feature found in any of the training examples processed by the machine learning model, wherein the machine learning model is configured to process each of the training examples to determine a predicted output for the training example from current values of the weights for the features in the training example, and wherein training the machine learning model comprises:

assigning a respective initial value for a regularization penalty for a particular weight for a particular feature, wherein the machine learning model is configured to determine the predicted output for each training example that comprises the particular feature by performing computations that include combining a current value for the regularization penalty for the particular weight for the particular feature with the current value of the particular weight for the particular feature;

determining whether a frequency of training examples processed by the machine learning model that comprise the particular feature exceeds a threshold frequency;

responsive to determining that the frequency of training examples processed during the training of the machine learning model that comprise the particular feature exceeds the threshold frequency, decreasing the initial value for the regularization penalty for the particular weight for the particular feature during the training of the machine learning model; and generating, after completion of the training of the machine learning model, a trained machine learning model based on trained values for the weights whose values have been adjusted based on the respective.

\* \* \* \* \*